United States Patent [19]

Lestradet

[11] 4,286,151

[45] Aug. 25, 1981

[54] DEVICE FOR GUIDING THE DISPLACEMENT OF A VEHICLE AND IN PARTICULAR AN AGRICULTURAL MACHINE

[76] Inventor: Maurice C. J. Lestradet, B.P. 10, 51230 Fere Champenoise, France

[21] Appl. No.: 94,811

[22] Filed: Nov. 16, 1979

[30] Foreign Application Priority Data

Nov. 21, 1978 [FR] France .................................. 78 32804

[51] Int. Cl.³ ............................................. G01D 5/30
[52] U.S. Cl. ................................ 250/230; 33/363 K; 250/231 R
[58] Field of Search ..... 250/231 R, 231 SE, 231 GY, 250/216, 230; 33/361, 363 R, 363 K

[56] References Cited

U.S. PATENT DOCUMENTS

| | | | |
|---|---|---|---|
| 2,480,134 | 8/1949 | Harrington | 250/230 |
| 2,777,070 | 1/1957 | Stamper et al. | 33/363 K |
| 3,277,304 | 10/1966 | Vyce | 250/231 GY |

*Primary Examiner*—David C. Nelms
*Attorney, Agent, or Firm*—Fidelman, Wolffe & Waldron

[57] ABSTRACT

The device comprises in a preferred embodiment, on one hand, an orienting system comprising a compass provided with two reflecting faces angularly offset 180°, an orientable optical system for detecting the angular deviation of the reflecting faces relative to a reference direction and means for displaying the detected deviation and, on the other hand, an automatic piloting system comprising a set of mirrors photocells, a servo-control device, and a cylinder device (32) for steering the steering wheels (33) of the vehicle.

Application in particular to agricultural machines.

10 Claims, 4 Drawing Figures

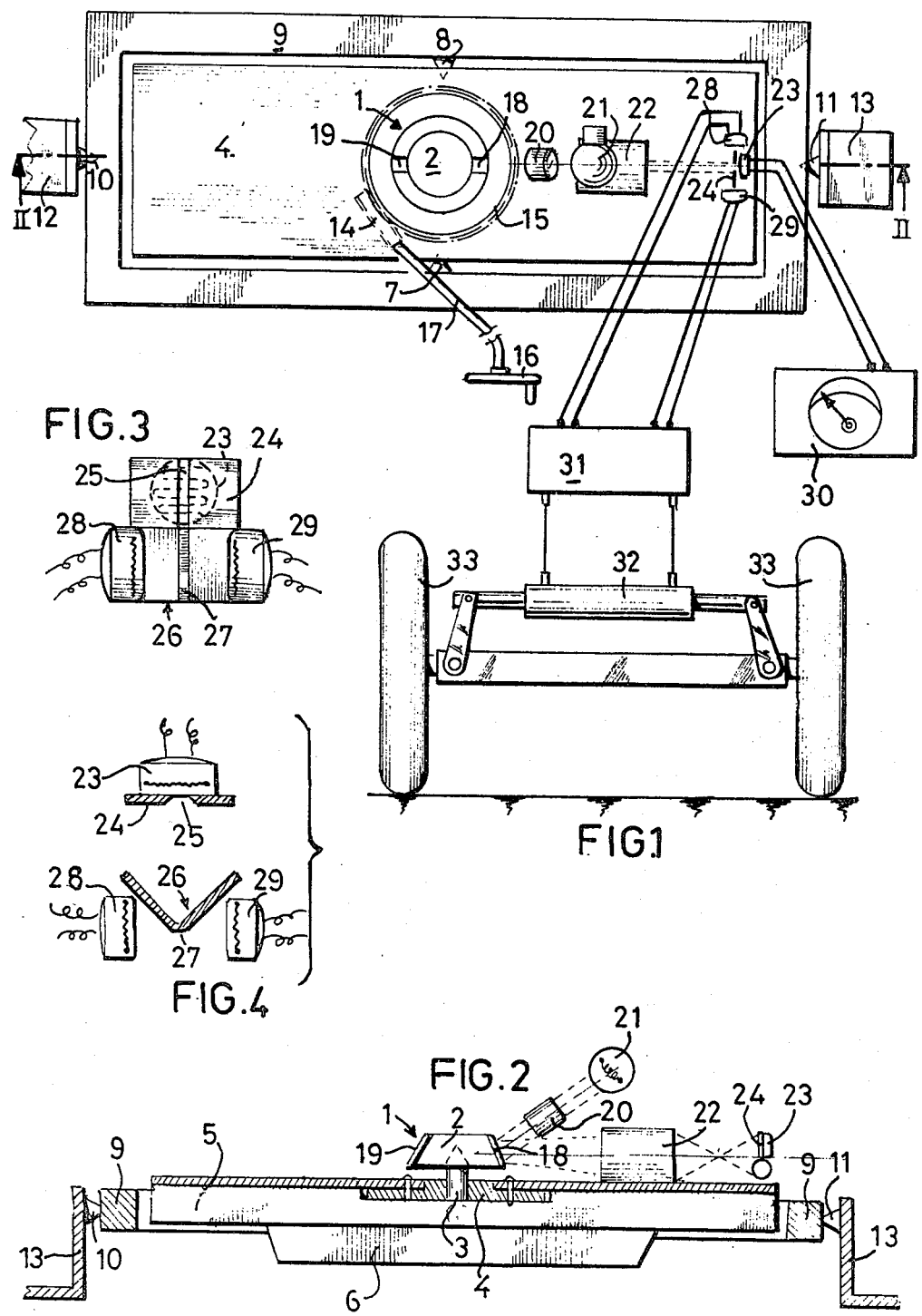

DEVICE FOR GUIDING THE DISPLACEMENT OF A VEHICLE AND IN PARTICULAR AN AGRICULTURAL MACHINE

The present invention relates to a device for guiding the displacement of a vehicle and in particular an agricultural machine, this device being more particularly adapted to permit the machine to effect different parallel passages over an area for the purpose of for example treating it in strictly parallel strips without omitting or overlapping zones of the surface.

Such a problem arises in particular in agriculture when an area of land which must be cultivated, that is to say tilled or sown, or which has plants which must be treated by spraying in successive passages and consequently in parallel strips.

Such a problem has already been explained in detail in French Pat. No. 75 36 474 filed by the Applicant in which the solution is afforded by a recording-reading device having an indicator strip of the itinerary travelled through by the agriculture machine.

Such a device which enables the driver of the machine to follow with fidelity, in the return direction, the edge of the strip which was treated in the forward direction without overlapping or moving away from the strip, whatever be the saw tooth path of the strip in question, requires means for orienting or steering the machine at the end of the forward travels and the return travels so as to enable it to effect a complete half turn so as to put it into a precise position for working on the following strip with the required orientation.

These orienting or steering means comprise a device having a navigation compass whose conventional compass card is replaced by two sectors which have different shades of color and are each graduated in 180°.

In the use of such a device, it has been found that certain disturbances occur owing to in particular the magnetic effect of the mass of metal of the agricultural machine on the moving magnetized element of the compass.

In order to avoid this disturbing effect, due to said metallic mass in particular, but also to the accumulator battery, the dynamo or the alternator, etc. . . . it has been proposed, according to the arrangement disclosed in the Application for a Certificate of Addition to the aforementioned patent filed on Oct. 29, 1976, by the applicant under French Pat. No. 76 32 688, to dispose the navigation compass at a distance from, and in front of, the metallic mass of the machine and to associate with the compass a magnifying optical system to permit the reading of the graduations of the compass notwithstanding the remoteness of the compass from the driving station of the machine.

Such a system having a magnifying objective considerably magnifies the graduations of the compass but is tiring for the driver owing to the parallax resulting from the large reading distance and is liable to render the latter false.

An object of the present invention is to overcome these drawbacks by providing other means for detecting the orientation of the vehicle which are precise, easier to use and less tiring for the driver.

According to the invention, there is provided a device for guiding the displacement of a vehicle, and in particular an agricultural machine, said device being more particularly adapted to enable the machine to effect different parallel passages over an area for the purposes of for example treating it in strictly parallel strips without omitting or overlapping zones of the area, said device comprising an orienting device including, on one hand, a navigation compass whose moving magnetized element carries at least one planar reflecting face, said unit being fixed on a support which is mounted on the chassis of the vehicle by means of a connecting system which enables said support to remain automatically horizontal under the effect of its own weight irrespective of the inclination of the chassis, means disposed in the driving station of the vehicle and connected to said support being provided for varying at will the angular position of the support, and, on the other hand, at least one optical system for locating the angular position of said reflecting face, said optical system being mounted on said support and comprising a source of light, a condenser whose optical axis intersects the path of the face and an objective for projecting the image of the face onto means responsive to the luminous flux, and means for displaying the degree of illumination of said means connected to the latter and disposed in said driving station.

According to a preferred embodiment, said movable magnetized element carries two diametrically opposed reflecting faces and the optical system is a single x system which is fixed on said support and comprises as the means responsive to the luminous flux a photocell in front of which there is disposed a mask provided with a slot whose width is equal to the image of the face projected by said objective.

In this preferred embodiment, the means for displaying the degree of illumination of the photocell is advantageously formed by a galvanometer comprising a wheatstone bridge in one of the branches of which bridge said cell is inserted.

The means for angularly orienting the support of the compass and of the optical system comprise, for example, a worm which is engaged with a worm wheel rigid with the support, a flexible cable which drives the worm, and an actuating wheel which drives the cable and is disposed in the driving station of the vehicle.

With such a device, it is very easy for the driver to previously orient the support of the compass in such manner as to bring one of the reflecting faces onto the path of the beam of light of the optical system and to control the strict alignment of the image of the face with the slot of the mask by reading the maximum deflection of the needle of the galvanometer. The driver can in this way maintain a well-determined heading or direction by correcting, if need be, the path of the vehicle in accordance with the deflection of the needle of the galvanometer so as to bring the vehicle back to the desired orientation.

At the end of the straight line, the device enables the driver to effect a complete half-turn so as to put the machine in position for a return travel which is parallel to the forward travel owing to the two reflecting faces which are angularly offset 180°. Indeed, it is sufficient for the driver to resume the maximum deflection of the needle of the galvanometer to be sure to have effected strictly a half-turn through 180°.

Further, in order to relieve the driver of the worry of having to constantly control and correct the path of the vehicle so as to maintain the predetermined orientation, the device of the invention advantageously further comprises an automatic piloting device for piloting the machine in accordance with a predetermined heading, this piloting device being brought into action or put out of action at will and comprising a system for detecting the direction and amplitude of the lateral deviation of the reflected beam passing through said projecting objective relative to the median position, a servo-control device connected to said detecting system and a hydraulic cylinder device for steering the steering wheels of the vehicle and connected to the servo-control device, said detecting system being mounted on said support.

In the case of a forward (or return) itinerary on a broken line path, there must be associated with the device of the invention a system for recording and reading the itinerary travelled through which is in particular of the type disclosed in French Pat. No. 75 36 474, the device of the invention being employed at each end of the forward or return travel and possibly on rectilinear sections of the itinerary.

Further features and advantages will be apparent from the ensuing description of an embodiment of the device according to the invention which is given solely by way of example with reference to the accompanying drawings in which:

FIG. 1 is a diagrammatic view of a device according to the invention.

FIG. 2 is a diagrammatic elevational view, partly in section on line II—II, of the orientable platform of the device of FIG. 1; FIG. 3 is a diagrammatic front elevational view of the disposition of the photocell of the device of FIGS. 1 and 2 and FIG. 4 is a top view of the device of FIG. 3, the cells having been horizontally offset for more clarity.

FIG. 1 illustrates the general arrangement of a device according to the invention.

This device comprises a navigation compass 1 whose movable dial carrying the compass card has been replaced by a member of revolution 2 symbolized by a truncated cone in FIGS. 1 and 2. This member 2 is magnetized and points in the north-south direction on a vertical pivot 3. The pivot 3 is rigid with a platform 4 which is mounted to be rotatable about the axis of the pivot 3 on a base on the lower side of which there is fixed ballast 6.

The base 5 is supported by two pivots 7 and 8 which are located on each side of the pivot 3 (FIG. 1) and are carried by a frame 9 which is mounted to pivot about an axis perpendicular to the axis of the pivots 7, 8 owing to the provision of two pivots 10 and 11. The pivots 10 and 11 are carried by brackets 12 and 13 fixed to the chassis (not shown) of an agricultural machine.

The platform 4 is orientable about the axis of the pivot 3 by means of a worm 14 which is engaged with a worm wheel 15 which is fixed under the bottom side of the platform 4 and rigid with the pivot 3.

The worm 14 is driven by a crank 16 through a flexible cable 17. The crank 16 is of course disposed in the driving station (not shown) of the machine.

The movable element 2 of the compass 1 has a frustoconical surface which is inclined at substantially 45° and carries two segments or faces 18 and 19 which are diametrally opposed.

These segments 18 and 19 are disposed on two generatrices of the truncated cone and define two rectangular planar surfaces which are reflecting and of the same dimensions.

The segments 18 and 19 may be formed by a reflecting coating or by any other suitable means.

Directed onto the frustoconical surface of the compass 1 by means of a light condenser 20 is a beam of light coming from the source of light 21. The source 21 and the condenser 20 are mounted on suitable supports (not shown) fixed to the platform 4. The orientation of the beam of light projected onto the compass 1 is such that the beam reflected by one of the segments 18 or 19, when it is on the axis of the beam, is pointed in a direction parallel to the platform 4 onto a projection objective 22 fixed to the platform.

The objective 22 is capable of projecting the image of one of the segments 18 or 19 onto a photocell such as a photoresistive cell 23 which is diposed vertically transversely of the beam of light and also fixed to the platform 4.

The image, in the plane of the photocell 23, of one of the segments 18 or 19 has the shape of a vertical rectangle of well-determined width and length.

The cell 23 is disposed in such manner as to receive the upper half part of said rectangular image through a mask 24 which is disposed in front of the cell 23 (see also FIGS. 3 and 4) and has a slot 25 with parallel edges and a width exactly equal to that of the image of the segment 18 (or 19) projected onto the cell 23.

The lower half part of said image is projected onto a set 26 of two mirrors at 45°, the edge of the dihedron thus formed being parallel to the vertical axis of the image projected onto the cell 23.

However, this edge has a flat 27 which defines a rectangular surface perpendicular to the optical axis of the system (FIG. 4) and having a width exactly equal to that of the slot 25, the flat 27 is disposed in vertical alignment with the slot 25 and below the latter. However, for reasons of clarity, the set of mirrors 26 has been horizontally offset forwardly in FIG. 4.

The mirrors 26 are capable of returning the beam of light received to either of two photocells 28 and 29 which are disposed laterally, the bisecting plane of the straight dihedron formed by the mirrors 26 coinciding with the vertical plane containing the optical axis of the system.

The cells 23, 28 and 29, the mask 24 and the mirrors 26 are fixed and mounted on suitable supports (not shown) rigid with the platform 4.

The photocell 23 is inserted in a wheatstone bridge incorporated in a galvanometer 30 disposed in the driving station of the agricultural machine.

The two photocells 28 and 29 are connected to a servo-control device 31 which actuates a double-acting cylinder device 32 which shifts the steering wheels 33 of the machine.

The purpose of the device proposed in the present invention is in particular to overcome certain drawbacks encountered in particular in the device for recording and reading the itinerary travelled through by a vehicle described in the application for the first certificate of addition to the main French Pat. No. 75 36 474 of Nov. 28, 1975, which was filled on Oct. 29, 1976 under French Pat. No. 76 32 688.

This type of device is more particularly adapted to reproduce on an indicator strip the path of the travel effected by a vehicle in a given area so as to enable the operator to follow with fidelity in the course of a second passage (return travel) of the machine, the path of the preceding passage (forward travel), which permits, for example in the case of spraying, a rational treatment by strictly parallel strips of the area to be treated without omitting or overlapping in zones of the area.

In the device described in the aforementioned application, there is employed a navigation compass whose conventional compass card is replaced by two sectors of different colors each of which is graduated in 180° and gives, in each forward and return travel, an identical reference number which is read at a distance through an objective which considerably magnifies the graduations of the compass.

It is indeed necessary to provide a magnifying objective owing to the fact that the graduated magnetic element of the compass is disposed at the front of the vehicle at such distance from the metallic mass of the latter as to ensure that the magnetic effect of this mass is negligible, the means for locating the directions successively assumed by said vehicle (which means the compass is a part of) further comprising means for viewing from the driving station of the vehicle.

Now, such a system results in fatigue on the part of the driver owing to the parallax resulting from the great reading distance and is liable to result in error in this reading.

The device according to the present invention avoids these drawbacks in that it transfers the indications of the directions followed to the dial of the galvanometer 30 which is in the driving station in the most convenient region for an easy, rapid and non-tiring reading, whereas the compass 1 and its optical assembly (20 to 25) may be placed in any appropriate region of the vehicle provided that the compass 1 is placed at a sufficient distance from the metallic mass of the vehicle to ensure that the magnetic effect of the mass is negligible.

Consequently, there is no longer any need to dispose the indicating system having a compass at a distance at the front of the vehicle on the axis of the latter and to provide it with a magnifying viewing optical system.

The platform 4 on which are mounted the compass 1 and its optical indicating system is automatically stabilized in the horizontal position owing to the ballast 6 and its universal joint system comprising the pivots 7, 8 and 10, 11 and the frame 9, irrespective of the inclination or position of the vehicle on the ground.

The universal joint system enables the mask 24 and the cell 23 to be maintained in a vertical position, which is required for the precision of the reading by the cell 23 of the angular position of the segment 18 or 19. With the vehicle equipped with the present device and stationary and in alignment for effecting its first forward travel, the driver, by means of the crank 16, angularly orients the platform 4 about the axis of the pivot 3 in such manner as to bring the reflecting segments 18, 19 in the vertical optical plane of the optical system 20 to 25. Note that the segments 18, 19 are not necessarily oriented to the north-south axis, since their orientation relative to this privileged axis is immaterial.

When this alignment has been achieved, one of the segments 18, 19 sends the light coming from the source 21 to the cell 23 through the slot 25 whose edges are perfectly parallel and strictly rectilinear.

As the width of the slot 25 is very exactly equal to the width of the projected segment, the deflection of the needle of the galvanometer is maximum when the beam reflected by the segment 18 or 19 is strictly on the median axis of the slot 25.

The purpose of the objective 22 is to enlarge the image of the segment 18 or 19 and permit its focusing.

As soon as the maximum deflection of the needle of the galvanometer has been obtained, the vehicle can start up and begin its work.

At the end of the travel, if it concerns a straight line, the needle of the galvanometer 30 must have the same position as at the start, that is to say it indicates the maximum deflection. At the end of the straight line at the end of the forward travel, the driver causes the tractor to effect a half-turn at a suitable distance so as to effect the return travel and the vehicle will be in lne when the needle of the galvanometer again reaches its maximum deflection, that is to say when the compass 1 rotates exactly through 180° and presents the other segment 19 or 18 in the path of the beam of light.

In the case of an area divided into parallel rectilinear strips, it is necessary to employ a device for recording and reading the itinerary travelled through in accordance, for example, with the device disclosed in French Pat. No. 75 36 474 with which device the machine is advantageously equipped. On the other hand, such a device is essential when the area to be treated is divided into parallel strips which have a broken-line configuration.

Consequently, in the case of parallel rectilinear strips, the driver can maintain the correct heading of the vehicle, and effect successive forward and rearward passages which are strictly parallel by constantly steering the steering wheels of his machine in such manner as to constantly have the maximum deflection of the needle of the galvanometer.

However, it is much more practical, less tiring and more reliable for the driver to bring into action the automatic piloting system formed by the cells 28, 29 and the servo control device 31.

Indeed, at the start of the first strip of the area to be treated, after having positioned the platform 4 in such manner as to obtain the maximum deflection of the needle of the galvanometer 30 the lower half part of the image of the segment 18 (or 19) projected by the objective 22 exactly coincides with the flat 27 of the set of the mirrors 26.

As this flat 27 and said image have strictly the same width, no ray of light is laterally deviated in the direction of either of the cells 28, 29. The servo-control device 31 is consequently not acted upon and the cylinder device 32 for piloting the wheels 33 maintains the wheels 33 in such direction that the machine moves in a straight line.

If the machine subsequently changes its heading or direction even very slightly, the beam of light projected by the objective 22 would no longer exactly impinge on the flat 27 but would be offset toward the left or the right as viewed in FIG. 4. In either case, the rays of light would impinge either of the mirrors 26 and would be laterally reflected at 90° toward the cell 28 of the cell 29.

Thereafter, the servo-control device 31 would be immediately actuated for controlling the cylinder device 32 and steering the wheels 33 in one direction or the other, depending on which cell is excited, so as to automatically put the machine back onto the required axis set at the start until the beam projected by the objective 22 once again impinges on the flat 27 without going beyond one side or the other thereof. Note that the larger the lateral offset of the beam reflected by the segment 18 or 19, the larger amount of light received by the cell 28 or 29 and the more energetic the actuation of the servo-control device 31 for resuming the correct heading.

The driver consequently does not have to intervene and merely visually checks now and again that the needle of the galvanometer 30 is always in the position of maximum deflection.

In respect of an area to be treated which may be divided into parallel rectilinear strips, the driver consequently intervenes only once for setting the heading to be maintained, that is to say at the start of the first forward travel. Thereafter, he will only intervene at the end of each forward travel and each return travel so as to put the servo-control device 31 temporarily out of action for effecting a half-turn and bringing the other segment (18, 19) on the axis of the beam of light from the source 21 so as to act on the following strip in the correct direction. As soon as the correct position at the start of this following strip has been achieved, the driver can put the servo-control device back into services and start up.

Such a device relieves the driver of the constant supervision and correction of the driving and avoids the tardy reactions of manual corrections which would result in overlapping or omission in the areas for example sprayed. Further, this device considerably reduces eye fatigue of the driver.

In the case of an area to be treated which may be divided into parallel strips having a broken line configuration, there must be employed a device which records the itinerary travelled through, such as that described in the aforementioned patent.

The well-known structure and operation on such a device will not be described again. This device makes a graphic recording of a forward travel itinerary, and, by reading the recorded strip, causes the vehicle to effect the return travel in a direction which is strictly parallel to the direction of the forward travel.

In the case of strips having a broken line configuration, the platform 4 will only be positioned at the end of the first forward travel. Throughout the duration of this first travel, the servo-control device 31 is of course out of action and the driver merely follows the broken line of the edge of the area to be treated, the itinerary being recorded graphically.

Having arrived at the end of this first travel and before starting the half-turn, the driver stops his machine and positions the platform 4 in such manner as to bring one of the segments, for example 18, in front of the beam of light until the maximum deflection of the needle of the galvanometer 30 has been achieved. When this setting has been made, the driver stakes out the position and effects the half-turn so as to present his machine at the start of the immediately adjacent return strip. The machine is in the correct direction when the segment 19 is located on the path of the beam of light and the deflection of the needle of the galvanometer 30 is maximum.

The driver can then start up in using the recorded graph of the forward travel itinerary for piloting his machine along a broken line path. Note that during the first straight-line segment of the return travel, the automatic piloting by means of the servo-control device 31 may be employed, after which this sytem must be put out of action since there is a change in the heading.

At the end of the return travel, before making the half-turn, the driver repositions the platform 4 and then turns his machine through 180°.

The platform 4 is thus repositioned only at the end of each forward travel and at the end of each return travel, irrespective of the number and magnitude of the intermediate changes in direction in the course of the broken-line itinerary.

If it is desired to permanently use the automatic piloting system by means of the servo-control device 31, it would then be necessary, immediately after each change of direction effected with the aid of the graph, to position the platform 4 so as to project the image of one of the segments 18 or 19 exactly on the flat 27 of the set of mirrors 26 and bring into action the servo-control device 31 until the next change in the heading.

As the orientation system carried by the platform 4 is adapted to locate changes of orientation of 180°, it will be clear that there could be employed a single reflecting segment instead of two and either a single optical reading system of the type shown in the drawings but rotatable through 180° about the axis of the compass 1, or two identical optical systems which are diametrically opposed relative to said axis.

Many modifications may be made in the described devices for, on one hand, indicating the angular position of the reflected beam by one of the segments 18, 19 with respect to a reference direction and, on the other hand, controlling the steering of the steering wheels of the machine in one direction or the other, depending on the angular deviation of said reflected beam relative to said reference direction, in one direction or the other, without departing from the scope of the invention.

I claim:

1. A device for guiding the displacement of a vehicle, having ground-contacting wheels, and in particular an agricultural machine, said device being more particularly adapted to enable the vehicle to effect different parallel passages over an area and comprising a support, a system for automatically maintaining said support in a horizontal position on a fixed part of the vehicle, a magnetized element acting as a compass and movably mounted on said support, means defining at least one planar light beam reflecting face on said magnetized element, means combined with said magnetized element for angularly orienting said magnetized element, an optical system mounted on said support for locating the position of said reflecting face, an automatic piloting device comprising a system mounted on said support for detecting the intensity of the beam reflected by said reflecting face, means for steering the steering wheels of the vehicle and a servo-control device connecting said intensity detecting system to said wheel steering means, said detecting system detecting the magnitude and direction of the lateral deflection of the beam reflected by said reflecting face and comprising two mirrors disposed at 90° to each other and constituting a vertical dihedral structure which defines a vertical flat surface at the dihedral angle between said two mirrors and having a width which is equal to the width of the image of said reflecting face projected by said optical system, the bisector plane of said dihedral angle coinciding with the plane of the optical axis of the incident beam impinging on said reflecting face and the optical axis of the beam reflected by said reflecting face, and two luminous flux responsive means respectively disposed laterally on both sides of said two mirrors and connected to said servo-control device.

2. A device as claimed in claim 1, wherein said optical system comprises at least one source of light, second means responsive to luminous flux, and a mask interposed on a sensitive face of said second means responsive to the luminous flux, said masking defining a slot which has parallel edges and a width exactly equal to the width of the image projected onto said reflecting face.

3. A device as claimed in claim 2, wherein said flat surface of the dihedral structure is located in the plane of the slot of said mask and has a height equal to the height of said slot.

4. A device as claimed in claim 2, wherein the optical system further comprises a condenser whose optical axis lies in the path of the beam from said source of light to said reflecting face, and an objective for projecting the image from said reflecting face onto the second luminous flux responsive means, the axis of the incident beam of light falling on said reflecting face, the axis of the beam of light reflected by said reflecting face, and the axis of said slot of said mask being contained in a vertical plane containing the axis of said magnetized element.

5. A device as claimed in claim 1, wherein said system for automatically mantaining said support in a horizontal position comprises universal joint means carrying said support and a platform is rotatably mounted on said support and said magnetized element is mounted on said platform, said means for angularly orienting said magnetized element acting directly on said platform.

6. A device as claimed in claim 5, wherein the means for angularly orienting said magnetized element comprise a worm wheel rigid with said platform, a worm engaged with said worm wheel, a flexible cable connected at one end to drive said worm and an actuating wheel connected to an opposite end of said cable for driving the cable, the wheel being disposed in a driving station of the vehicle.

7. A device as claimed in any one of the claims 1 to 5, wherein said magnetized element carries two diametrically opposed reflecting faces, there being a single optical system mounted on said support.

8. A device as claimed in any one of the claims 1 to 5, wherein said magnetized element carries a single reflecting face and there is provided a single optical system which is capable of occupying two positions which are diametrically opposed relative to a vertical axis of rotation of said magnetized element.

9. A device as claimed in any one of the claims 1 to 5, wherein said magnetized element carries a single reflecting face and it comprises two identical optical systems which are disposed to be diametrally disposed relative to a vertical axis of rotation of said magnetized element.

10. A device as claimed in any one of the claims 2 to 5 further comprising means for displaying the degree of illumination of said second means responsive to luminous flux and connected to said second means responsive to luminous flux and disposed in a driving station of the vehicle, said display means comprising a galvanometer having a wheatstone bridge in one of the branches of which bridge said second means responsive to luminous flux is inserted.

* * * * *